LAWBAUGH & WILLIAMS.
Cultivator.
No. {2,040, 33,044.}
Patented Aug. 13, 1861.
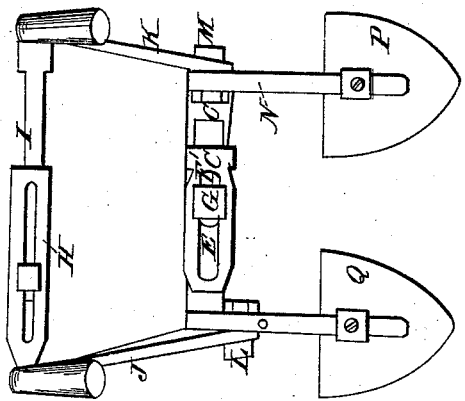
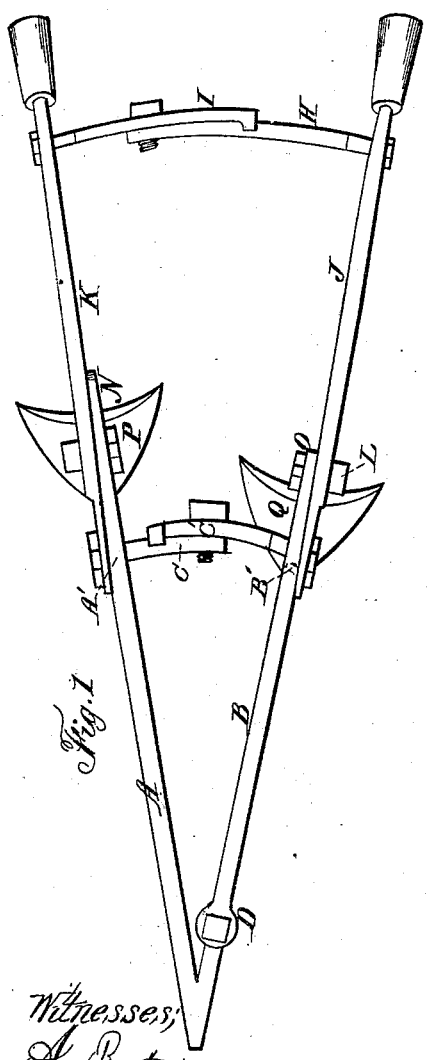
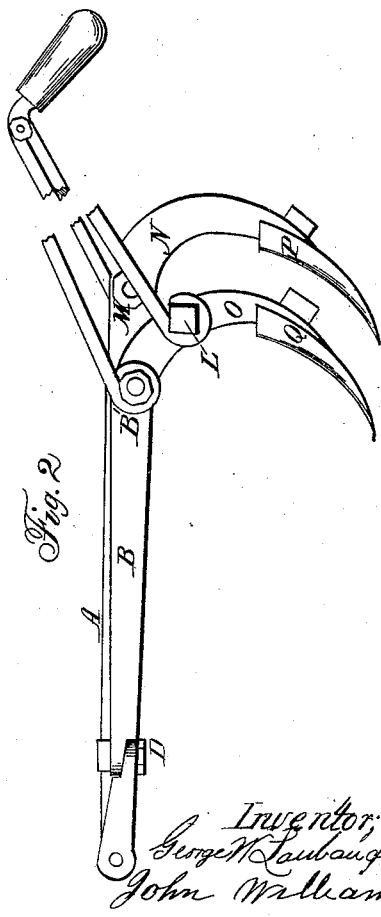

UNITED STATES PATENT OFFICE.

G. W. LAWBAUGH AND JNO. WILLIAMS, OF SHANESVILLE, OHIO.

IMPROVEMENT IN CULTIVATORS.

Specification forming part of Letters Patent No. 33,044, dated August 13, 1861.

*To all whom it may concern:*

Be it known that we, G. W. LAWBAUGH and JOHN WILLIAMS, of Shanesville, in the county of Tuscarawas and State of Ohio, have invented new and useful Improvements in Shovel-Plows; and we do hereby declare that the following is a full and complete description of the construction and operation of the same, reference being had to the accompanying drawings, making part of this specification, in which—

Figure I is a top view. Fig. II is a side view, and Fig. III is a rear view.

Like letters refer to like parts in the several views.

To enable others skilled in the art to make and use our invention, we will proceed to describe its construction and operation.

In the several views, A B C C' represent a triangular frame of wrought-iron. The forward end of the piece A is turned at an acute angle, and at D forms a horizontal joint with the piece B, thus allowing the piece B to diverge more or less from the piece A. At A' and B' the pieces A and B are connected by curved arms C and C', which are made adjustable by means of the slots E F and screw-bolt G. A similar adjustment for the handles of the plow is seen at H I in Figs. I and III, the handles J K being attached to the side pieces, A and B. At A' and B' and at L and M the handles branch, as seen in Fig. II. From the points M and B' the pieces A and B curve downward, as seen at N O, to receive the blades of the plow, which are seen, respectively, at P and Q.

It will be observed that the piece A of the frame is a little longer than the piece B, and consequently the blade Q stands a little forward of the blade P, and in this manner the soil thrown up by the blade P is caused to overlap that raised by the blade Q.

In ridging ground for planting corn or other similar crops, the blades can be set at such a distance as to make the desired kind of a ridge, and in plowing between the rows preparatory to hoeing, the blades can be set at such distance as to allow the blades to move forward at equal distance between the rows, in which case it can be drawn by a span of horses.

We are aware that various devices have been adopted for spreading the side beams of cultivators, both by the action of hinges and springs. Therefore we do not claim any of these devices *per se;* but What we do claim as our improvement, and desire to secure by Letters Patent, is—

The special arrangement of the side pieces, A B, hinge D, arms C C' and H I, and handles J K and shovels P Q, the whole being constructed and operating as and for the purpose set forth.

G. W. LAWBAUGH.
JOHN WILLIAMS.

Witnesses:
A. BATES,
HENRY SCHWEITZER.